United States Patent
Axblom et al.

(10) Patent No.: US 11,904,788 B2
(45) Date of Patent: Feb. 20, 2024

(54) VEHICLE AIRBAG SYSTEM

(71) Applicant: Autoliv Development AB, Vargarda (SE)

(72) Inventors: Per Axblom, Alingsas (SE); Anders Einarsson, Vargarda (SE); Mats Berntsson, Alingsas (SE); Stephane Pretot, Lerum (SE); Par Sandinge, Alingsas (SE); Fredrik Kjell, Alingsas (SE); Alexander Riess, Alingsas (SE); Jules Houessou, Gothenburg (SE); Charlotte Lundqvist, Gothenburg (SE); Carl-Johan Svenson, Vargarda (SE); Hanna Karlsson, Vargarda (SE); Ola Henriksson, Vargarda (SE)

(73) Assignee: Autoliv Development AB, Vargarda (SE)

( * ) Notice: Subject to any disclaimer, the term of this patent is extended or adjusted under 35 U.S.C. 154(b) by 85 days.

(21) Appl. No.: 17/753,812

(22) PCT Filed: Sep. 3, 2020

(86) PCT No.: PCT/EP2020/074541
§ 371 (c)(1),
(2) Date: Mar. 15, 2022

(87) PCT Pub. No.: WO2021/052764
PCT Pub. Date: Mar. 25, 2021

(65) Prior Publication Data
US 2022/0340096 A1 Oct. 27, 2022

(30) Foreign Application Priority Data
Sep. 16, 2019 (EP) .................................... 19197620

(51) Int. Cl.
*B60R 21/207* (2006.01)
*B60R 21/231* (2011.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC ............ B60R 21/207; B60R 21/23138; B60R 21/233; B60R 21/2338; B60R 2021/23308; B60R 2021/0048; B60R 21/231

See application file for complete search history.

(56) References Cited

U.S. PATENT DOCUMENTS 11,383,667 B1 * 7/2022 Kadam ............. B60R 21/23138
2014/0062069 A1 3/2014 Fukawatase
(Continued)

FOREIGN PATENT DOCUMENTS

DE 10 2016 225402 A1 6/2018
EP 3 444 148 A1 2/2019
(Continued)

*Primary Examiner* — Karen Beck
(74) *Attorney, Agent, or Firm* — Foley & Lardner LLP (57) ABSTRACT

A vehicle seat and an airbag system, the seat having a backrest and a squab, extending from the backrest in a longitudinal direction, the backrest extending in height from the squab at a first lower position to a second upper position arranged proximal to shoulders of an occupant in a seated position, the airbag system having an airbag to receive inflating gas from an inflator to inflate the airbag, in which the airbag includes an upper region that extends over a head of the occupant in the seated position and a lower region that extends between a first and second side of the backrest and around a mid-section of the seated occupant, the airbag (Continued)

system having a tether system interconnecting the seat at the second upper position of the backrest and airbag to restrain the lower region of the airbag in the inflated configuration in the longitudinal direction.

20 Claims, 9 Drawing Sheets

(51) Int. Cl.
    *B60R 21/233*      (2006.01)
    *B60R 21/2338*      (2011.01)

(52) U.S. Cl.
    CPC .................. *B60R 21/23138* (2013.01); *B60R 2021/23146* (2013.01); *B60R 2021/23308* (2013.01)

(56) References Cited

U.S. PATENT DOCUMENTS

| | | | |
|---|---|---|---|
| 2019/0031133 A1* | 1/2019 | Dry | B60R 21/2334 |
| 2019/0054884 A1* | 2/2019 | Dry | B60R 21/2342 |
| 2019/0061676 A1 | 2/2019 | Kwon | |
| 2021/0354650 A1* | 11/2021 | Harm | B60R 21/261 |
| 2023/0067856 A1* | 3/2023 | Min | B60R 21/23138 |

FOREIGN PATENT DOCUMENTS

| | | | | |
|---|---|---|---|---|
| JP | 2017030638 A * | 2/2017 | | |
| JP | 2017 124759 A | 7/2017 | | |
| JP | 2017124759 A * | 7/2017 | | |
| WO | WO-2016174785 A1 * | 11/2016 | ........... | B60R 21/207 |
| WO | 2019/107398 A1 | 6/2019 | | |
| WO | WO-2020080747 A1 * | 4/2020 | ........... | B60R 21/207 |
| WO | WO-2020141737 A1 * | 7/2020 | | |

* cited by examiner

VEHICLE AIRBAG SYSTEM

TECHNICAL FIELD

The present disclosure relates to a seat mounted airbag system for use in a human occupant carrying vehicle, the airbag system to provide protection to said occupant when the vehicle is subject to a crash.

BACKGROUND

In order to prevent or reduce injuries to occupants of motor vehicles arising from accidents, it is commonplace to implement an airbag operatively connected to a seat of the vehicle. The seat comprises a backrest and a squab, which extends from the backrest in a longitudinal direction, the backrest extending in height from the squib. The seat to seat an occupant in a seated position.

It has been proposed to implement the airbag, which in an inflated configuration, is arranged as frontal life cell. The frontal life cell includes an upper region that extends over a head of the occupant in the seated position and a lower region that extends from a first side of the backrest, around an abdomen of the occupant in the seated position, and to a second side, which is laterally spaced-apart from the first side of the backrest. The airbag is therefore arranged to encapsulate an upper body and head of the occupant.

The frontal life cell needs to be dimensioned to accommodate the head of the occupant, including when the occupant is leaning forward from the seat, and for a range of occupant sizes. The frontal life cell needs to be dimensioned to couple early on in an impact with the abdomen of the occupant. Dimensioning and arranging the frontal life cell to provide these functions, particularly for said range of occupant sizes, has proven difficult.

Therefore, in spite of the effort already invested in the development of said airbag systems, further improvements are desirable.

SUMMARY

The present disclosure provides a vehicle seat and an airbag system. The seat comprises a backrest and a squab, which extends from the backrest in a longitudinal direction, the backrest extending in height from the squab from a first lower position to a second upper position of the seat that is arranged proximal shoulders of an occupant in a seated position. The airbag system comprises an airbag to receive inflating gas from an inflator to inflate the airbag from a deflated configuration to an inflated configuration.

In embodiments, the airbag includes an upper region (e.g. a top and portions of sides and a front) that extends over a head of the occupant in said seated position. In embodiments, the airbag includes a lower region (e.g. at least a portion of a front) that extends in the lateral direction around, e.g. over, a mid-section of the occupant in said seated position. It may also extend from, including proximal, a first and second side of the backrest.

In embodiments, the airbag system includes a tether system interconnecting the seat at the second upper position of the seat, e.g. the backrest and/or headrest, and airbag to restrain in the longitudinal direction the lower region, e.g. it connects to the lower region, of the airbag, to couple the lower region of the airbag to the mid-section of the occupant.

With the aforedescribed airbag and tether system implementation, when the seat and occupant are subject to highly impulsive loading, such as that experienced by a crash, the airbag can be deployed around the occupant in a manner to 1) control deployment over a head of the occupant, which is achieved by connecting the tether system at the second upper region of the backrest, i.e. in operative proximity to closely control deployment over the head 2) permit early coupling with the mid-section of the occupant to reduced injury to this section, which is achieved by implementing the tether system to restrain the lower region of the airbag in at least the longitudinal direction.

In embodiments, the tether system includes a tether which interconnects the second upper region of the seat and the lower region of the airbag. By implementing a direct connection between the second upper region of the seat and the lower region of the airbag, said controlled deployment and early coupling is ensured. In embodiments, the tether extends around or proximal a lower edge of a side of the airbag.

In embodiments, with the airbag in the deflated configuration, at least part, e.g. the part other than that connected to the second upper region of the backrest and which extends therefrom to the headrest, of the tether system is carried by a headrest of the seat. By implementing the tether system in the headrest, it can be ensured that as the airbag is deployed around the head of the occupant its position is controlled. In embodiments, with the airbag in the deflated configuration, at least part of the airbag is carried by a headrest of the seat.

In embodiments, with the airbag in the deflated configuration, the tether system extends from the second upper region of the backrest and around the headrest. As used herein and in respect of the tether system and headrest, the term "around" may refer to one or more tethers extending fully or partially along the headrest. By implementing the tether system to extend around the headrest, it can be ensured that, as the airbag transitions from the deflated to the inflated position, the tether system extends in the lateral direction around a head of the occupant and then the mid-section without needing a dedicated system to laterally extend it.

In embodiments, with the airbag in the inflated configuration, the tether system includes a first tether extending, including directly or proximal to, in the longitudinal and lateral directions and around the mid-section of the occupant, from the first side of the backrest, and the tether system includes a second tether extending, including directly or proximal to, in the longitudinal and lateral directions and around the mid-section of the occupant, from the second side of the backrest. Such an arrangement of the tethers may provide effective restraint of the airbag, particularly as it is being deployed.

In embodiments, the first and second tether overlap each other between the first and second side, e.g. in the inflated and/or deflated configuration. Such an arrangement of the tethers may provide effective restraint of the airbag and/or controlled deployment of the airbag over the head of the occupant.

In embodiments, the first and second tether overlap each other and extend beyond the overlap. By extending the tether beyond the overlap, it can be ensured that the tether can control a greater portion of the airbag than a single tether. In embodiments, a first portion of the first tether extends from the first side of the backrest, including directly or proximal, around or through an exterior of a side portion the airbag, and a second portion of the first tether extends along an interior of the airbag from the first portion between a front portion of the airbag and an occupant in the seated position. By implementing the tether to extend from an outside to an inside of the airbag along respective side and front portions, more precise positioning and coupling of the front portion can be ensured.

In embodiments, the first tether transitions from an exterior of the airbag to an interior of the airbag at a sliding interface, which is arrange to allow sliding of the tether relative the airbag. A sliding interface may enable the tether to conveniently rearrange itself as the airbag is inflating.

In embodiments, a side of the airbag includes peripheral inflatable bag portions and a non-inflatable portion. The first and second tether are connected to an inflatable bag portion at a bottom of the side. By connecting the tether to the inflatable bag positions, a primary structure of the airbag can be controlled.

In embodiments, a guide is arranged to slideably engage a tether of the tether system, the guide extending from a side, including directly or proximal, of the seat. By implementing a guide along which the tether system can slide, a position of the tether system may be more precisely controlled as the airbag is inflated.

In embodiments, the tether is connected at a first and second end to the airbag, the guide arranged between the first and second end. By implementing a two point connection of the tether with a slideable connection therebetween, it can be ensured that the airbag is held under the same tension at multiple points. In embodiments, with the airbag in the inflated configuration, a first end of the tether is connected to the lower region of the airbag and a second end of the tether is connected to an upper region of the airbag. By implementing a connection of the first end and second end to respective upper and lower regions of the airbag, the multi point connection system can control the upper and lower portions of the bag. In embodiments, an angle between the first and second end at the guide is greater in the inflated configuration than in the deflated configuration. With said angle increase the multipoint connection system expands from a compact state on inflation of the airbag.

In embodiments, a first portion extends between the first end and the guide and a second portion extends between the second end and the guide. In embodiments, in the deflated configuration, the first portion may have a lesser length than first the second portion. In embodiments, the tether system is configured with the second portion to increase in length as the airbag is inflated.

In embodiments, a side of the airbag includes peripheral inflatable bag portions and a non-inflatable portion. The first end is connected to an inflatable bag portion at a bottom of the side and the second end is connected to an inflatable bag portion at a top of the side. By connecting the tether to the inflatable bag positions, a primary structure of the airbag can be controlled.

In embodiments, with the airbag in the inflated configuration, the first end is arranged longitudinally in front of the second end. By arranging the first end in front of the second end, as the airbag is deployed the portions of the tether extending from these ends can fan out, rather than overload or collide.

In embodiments, the tether system extends around an exterior, e.g. a side portion and/or front portion, of the airbag in the inflated configuration. In some embodiments, the tether system only extends around an exterior of a side portion of the airbag. Such an embodiment can be implemented with the multi point connections system since with multiple point connection of the tether there is less need for it to provide an additional connection around the front portion since the multiple point connections on the side provide sufficient connection stability.

In embodiments, the tether system interconnects the seat, e.g. in locations other than the second upper position of the seat, and airbag to restrain in the longitudinal direction the lower region, of the airbag, to couple the lower region of the airbag to the mid-section of the occupant. For example, in the embodiment comprising a guide the guide may be arranged at any position on the backrest, including the lower mid or upper positions.

Disclosed herein is a method of deploying an airbag to protect an occupant of a vehicle seat, the method comprising: inflating an airbag with an inflator; controlling a position of the inflated airbag with a tether that extends from an upper region of the seat to a lower region of the airbag. The method may implement features of the preceding embodiments, or another embodiment disclosed herein.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Before describing several embodiments of the apparatus, it is to be understood that the system is not limited to the details of construction or process steps set forth in the following description. It will be apparent to those skilled in the art having the benefit of the present disclosure that the system is capable of other embodiments and of being practiced or being carried out in various ways.

The present disclosure may be better understood in view of the following explanations:

As used herein the term "vehicle" may refer to a ground based vehicle capable of transporting, in a seated position, one or more occupants. The vehicle may be motorised.

As used herein the term "longitudinal direction" may refer to a direction of travel of the vehicle and/or a direction of extension of a squab from a backrest of a seat. In instances wherein the seat is not aligned to the direction of travel, it will be understood that the longitudinal direction is not parallel to the direction of travel. The longitudinal direction may be parallel to the ground.

As used herein the term "lateral direction" may refer to a direction perpendicular to the longitudinal direction and a direction extending from one side to another of the seat. The lateral direction may be parallel to the ground.

As used herein the term "height" may refer to a direction perpendicular to the longitudinal and lateral direction.

As used herein the term "airbag system" may refer to a vehicle occupant restraint system that includes: an airbag; inflator; impact sensing system; and control system. The sensing system provides a signal, which is indicative of a crash, to the control system, which controls the inflator to inflate the airbag.

As used herein the term "airbag" or "bag" may refer to an inflatable bag formed of a flexible material, such as a fabric. The bag is capable of inflating extremely quickly then quickly deflating during a collision. The bag inflates from a deflated configuration in which it is folded and/or rolled or otherwise collapsed.

As used herein the term "inflator" or "inflation module" may refer to a device capable of producing a gas capable of rapidly inflating the airbag, e.g. in 20-30 milliseconds. The inflator may include an ignition system to ignite a solid propellant inside the airbag inflator, the burning propellant to generate an inert gas for inflation.

As used herein the term "tether system" may refer to an arrangement of one or more tethers and optional associated componentry, e.g. a guide and/or fixing system for connection of a tether to a seat or airbag.

As used herein the term "tether" may refer to a flexible linkage by which a movable object, such as an airbag, is fastened to a fixed object, such as a vehicle seat, so as to limit its range of movement. A tether may include a cord, strip of material, rope, or the like.

As used herein the term "occupant" may refer to a human passenger of the vehicle. A mid-section of the occupant may refer to an abdominal region.

As used herein, and in respect of the seat, the term "first lower position" or "first lower portion" may refer to a region of proximal to the seat, e.g. the backrest, proximal the squab.

As used herein, and in respect of the seat, the term "second upper position" or "second upper portion" may refer to a region of or proximal to the seat which is above the first lower region, e.g. by at least 30 or 40 or 50 or 60 cm, which is proximal and optionally above the shoulders of a seated occupant. The second upper position may include to a top portion of the backrest, e.g. a region that extends less than 40 or 30 or 20 cm downwards from the tip of the backrest. The second upper position may also include the headrest.

As used herein, and in respect of the airbag, the term "upper region" may refer to a portion of the airbag that is arranged over and/or proximal a head of a seated occupant. It may therefore include a top portion of the airbag and adjacent portions of the side and/or front of the airbag.

As used herein, and in respect of the airbag, the term "lower region" may refer to a portion of the airbag that is arranged over a mid-section of a seated occupant, e.g. to couple with a mid-section of the occupant during a crash.

Seat

Referring to FIGS. 1 to 6, a vehicle seat 2 and an airbag system 4 is illustrated. The seat 2 comprises a backrest 6 and a squab 8. The squab 8 is a posterior support for an occupant 12 and extends generally in a longitudinal direction 10 from the backrest 6. The backrest 6 is arranged to engage a back of an occupant 12 and extends generally in a height direction 14 from the squab 8. The backrest 6 includes a first side 16 and a second side 18, which are spaced apart in the lateral direction 20.

The backrest 6 includes second upper position 50, and first lower position 52, which are distal and proximal the squab 8 respectively. The second upper position 50 includes a top 62 of the backrest 6. The first lower position 52 includes a base 64 of the backrest 6, which cooperates with the squab 8. A headrest 54 is connected to and extends in the height direction 14 from the top 62 of the backrest 6.

In embodiments, which are not illustrated, the backrest is formed integrally with the squab. The headrest is formed integrally with the backrest.

Airbag System

Figure 3:
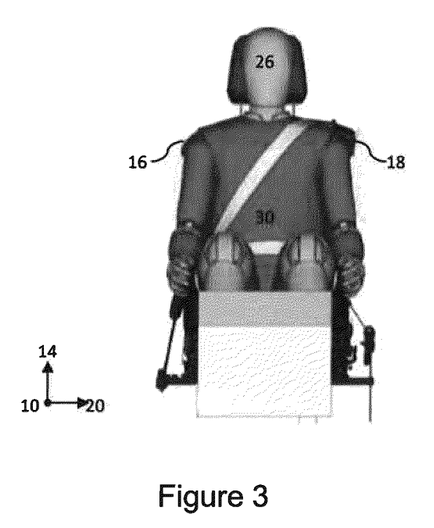
Figure 4:
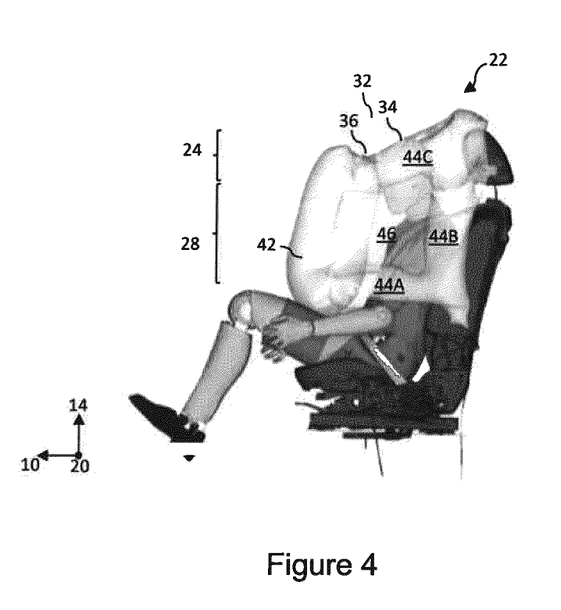
FIGS. 4-6 are respective side, front and top views of a vehicle seat and airbag system, wherein an airbag of said airbag system is arranged in an inflated configuration.
Figure 5:
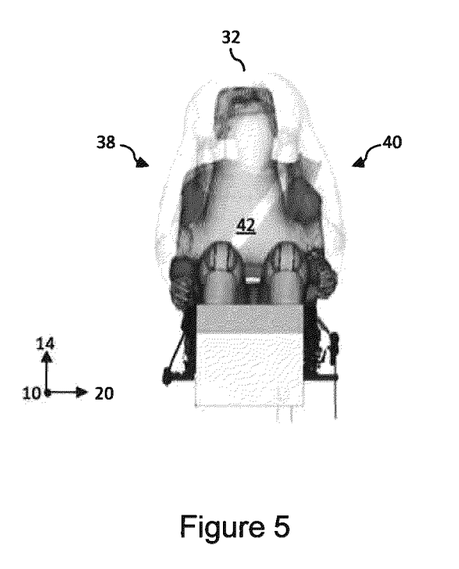
Figure 6:
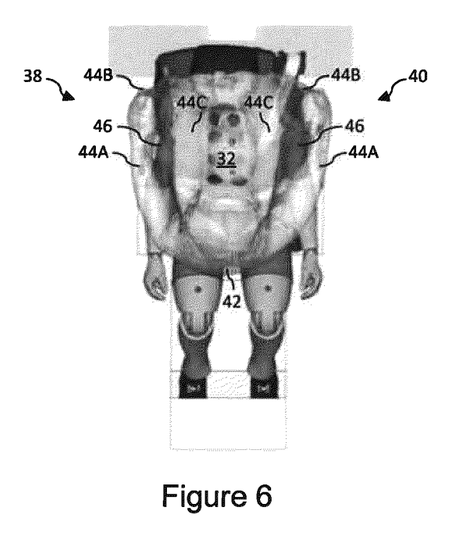

The airbag system 4 comprises an airbag 22 to receive inflating gas from an inflator (not shown) to inflate the airbag 22 from a deflated configuration (shown in FIGS. 1-3) to an inflated configuration (shown in FIGS. 4-6).

Figure 1:
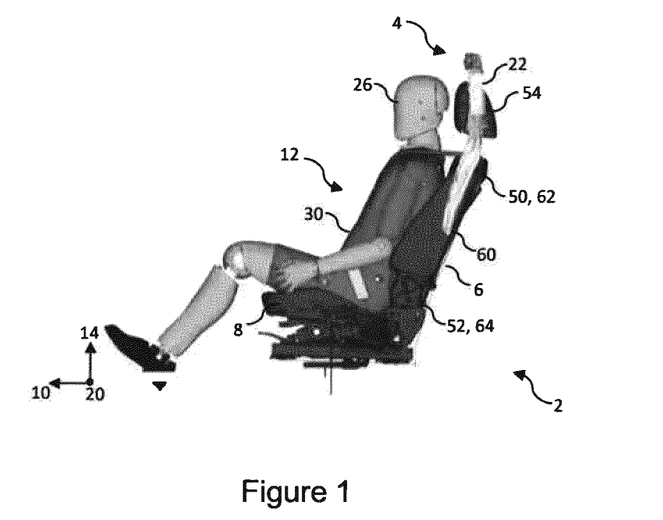
FIGS. 1-3 are respective side, front and top views of a vehicle seat and airbag system, wherein an airbag of said airbag system is arranged in a deflated configuration.
Figure 2:
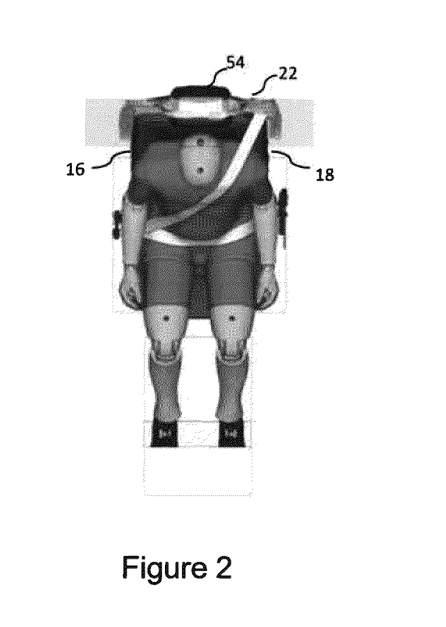

In the deflated configuration the airbag 22 extends in a first portion around the second upper position 50, and in particular around the backrest 6 on the first and second sides 16, 18, and around the headrest 54. The airbag 22 extends in second portions from the second upper position 50 on the first and second sides 16, 18, to ends 60, which are arranged proximal the occupants 12 elbows in the seated position. In particular, the ends 60 are arranged approximately mid-way between the top 62 and base 64 of the backrest 6.

In the inflated configuration the airbag 22 includes an upper region 24 that extends over a head 26 of the occupant 12 in said seated position and a lower region 28 that extends between the first 16 and second side 18 of the backrest 6 and around a mid-section 30 of the occupant 12 in said seated position.

In particular, in the inflated configuration, the upper region 24 of the airbag 22 includes a top 32. The top 32 includes a first portion 34 that extends primarily in the lateral direction 20 between the first 16 and second side 18 of the backrest 6 and longitudinal direction 10 to cover a crown of the head 26 of the occupant 12. The top 32 includes a second portion 36, which also extends in the lateral direction 20 and longitudinal direction 10 but with more extension in the height direction 14, such that a forehead of the head 26 of the occupant 12 is covered. The airbag 22 includes a first side 38, a second side 40 and a front 42, portions of which in the upper region 24 are interconnected by the top 32 to enclose the head 26. Portions of the top 32 and sides 38, 40 are connected to the headrest 54.

In particular, in the inflated configuration, the lower region 28 of the airbag 22 includes a portion of the front 42. Said portion of the front 42 extends primarily in the lateral direction 20 between the first 16 and second side 18 of the backrest 6 and height direction 14 to cover the mid-section 30 of the occupant 12.

In the lower region 28, the first side 38 and the second side 40 are interconnected by the front 42 to enclose the mid-section 30. The first side 38 and a second side 40 extend in the longitudinal direction 10 from the front 42 to the ends 60, which are connected to the backrest 6. The front 42 overlaps the mid-section and the face of the occupant 12.

Referring to FIGS. 4 and 6, the front 42 is formed of entirely inflatable bag portions. The first side 38 and second side 40 are formed of inflatable portions 44A, 44B, 44C around their periphery, with a non-inflatable portion 46 interconnecting the periphery. Inflatable portions 44A, 44C are arranged generally parallel to each other in the longitudinal direction 10, with the inflatable portion 44B interconnecting portions 44A, 44C, and extending in the height direction 14 from ends 60.

The top 32 is formed of a non-inflatable portion, which extends between the inflatable portion 44C of the sides 38, 40, and the front 42. In this way a cavity is formed, in which the head 26 of the occupant 12 is received.

The top 32, sides 38, 40 and front 42 have interior surfaces that define a cavity to surround the occupant, to engage with and restrain the occupant by gradual absorption of kinetic energy. The exterior surfaces may also deflect to absorb kinetic energy of colliding objects.

In the deflated configuration, the top 32 and front 42 are carried in the headrest 54, i.e. in the first portion of the airbag 22. In the deflated configuration, the sides 38, 40 are carried at least in part by the second portion of the airbag 22. During deployment, the inflatable bag portions 44A, 44B that form the periphery of the lower region 28 extend from being folded and/or rolled in longitudinal alignment with each other (FIG. 1) to forming an L-shape (FIG. 4).

Moreover, as the airbag 22 is deployed from the deflated configuration to the inflated configuration it will be understood that the front 42 and top 32 are deployed over the head of the occupant 12, and that the sides 38, 40 are deployed longitudinally forward of sides of a torso occupant 12.

Subsequent to arrangement of the airbag in the inflated configuration, the airbag deflates to a second deflated configuration (not illustrated) wherein the airbag is deployed but not fully inflated.

In variant embodiments, which are not illustrated, alternative airbag configurations are implemented, for example: the front only overlaps the mid-section and not the face; the top is inflatable; the top is omitted; the sides are entirely inflatable; the sides may be obviated in favour of the tether system and a more comprehensive front. Whilst the airbag is illustrated as extending from the backrest and headrest, it may also extend from a shroud or other support structure that is operatively aligned with these components.

Embodiment 1

Referring to FIGS. 7-12, in a first embodiment, the airbag system 2 comprises a tether system 48 interconnecting the seat 2 at the second upper region 50 of the backrest 6 and airbag 22 to restrain the lower region 28 of the airbag 22 in the inflated configuration (FIGS. 10-12) in the longitudinal direction 10.

Initially considering the deflated configuration (FIGS. 7-9), the tether system 48 includes a first tether 56 and second tether 58. The first tether 56 and second tether 58 extend from the respective first side 16 and second side 18 of the second upper region 50 of the backrest 6 and around the headrest 54. In this manner, a substantial portion (e.g. at least 60 or 70% of the length of each tether) of the tether system 48 is carried by the headrest 54.

Figure 7:
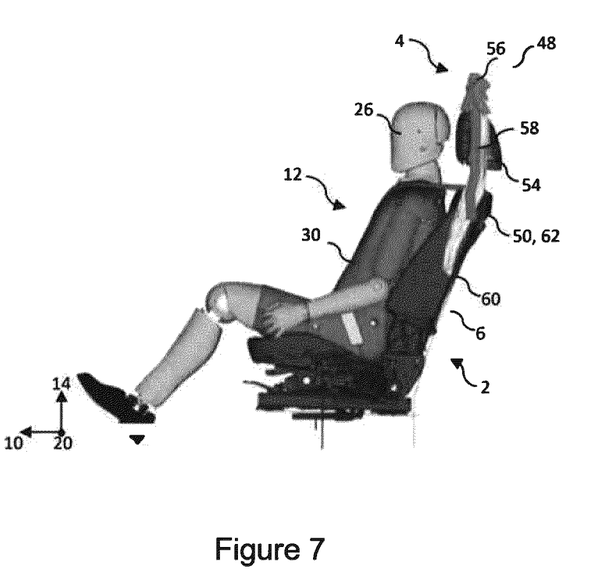
FIGS. 7-9 are respective side, front and top views of a vehicle seat and embodiment airbag system, wherein an airbag of said airbag system is arranged in a deflated configuration.
Figure 8:
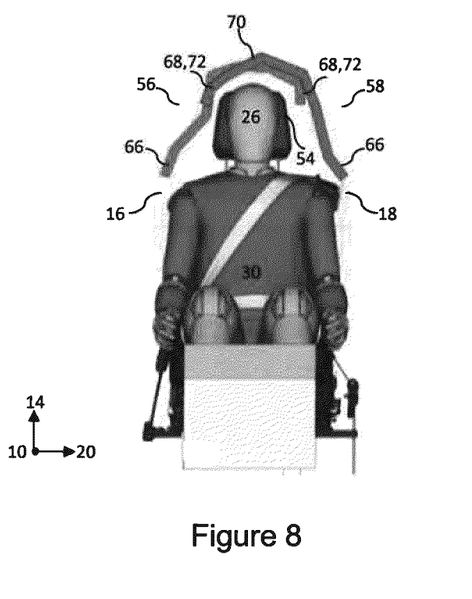
Figure 9:
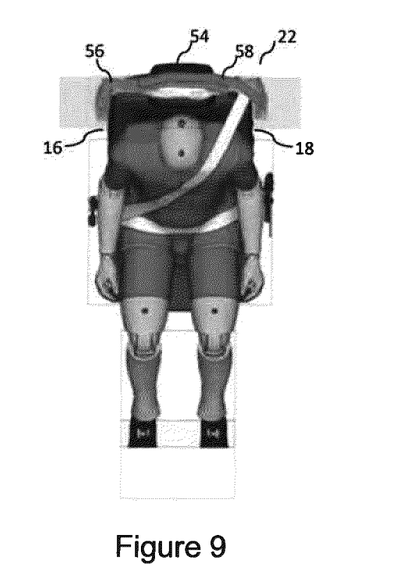

A first end 66 of the first tether 56 and second tether 58 are connected to the backrest by a connection (not shown), which can enable pivoting of the tether during transition between the deflated and inflated positions. Examples of such a connection includes a swivel connection or rivet or other pin etc.

A second end 68 of the first tether 56 and second tether 58 are arranged on the headrest 54. Between the first and second end 66, 68, the first tether 56 and second tether 58 overlap at an interface 70, such that extension portions 72 extend beyond the interface 70.

In the deflated configuration, first tether 56 and second tether 58 are connected to the portion of the airbag 22 that, in the inflated position, forms the lower region 28.

Now considering the inflated configuration (FIGS. 10-12), the tethers 56, 58 interconnect directly the second upper position 50 of the seat and the lower region 28 of the airbag 22.

Figure 10:
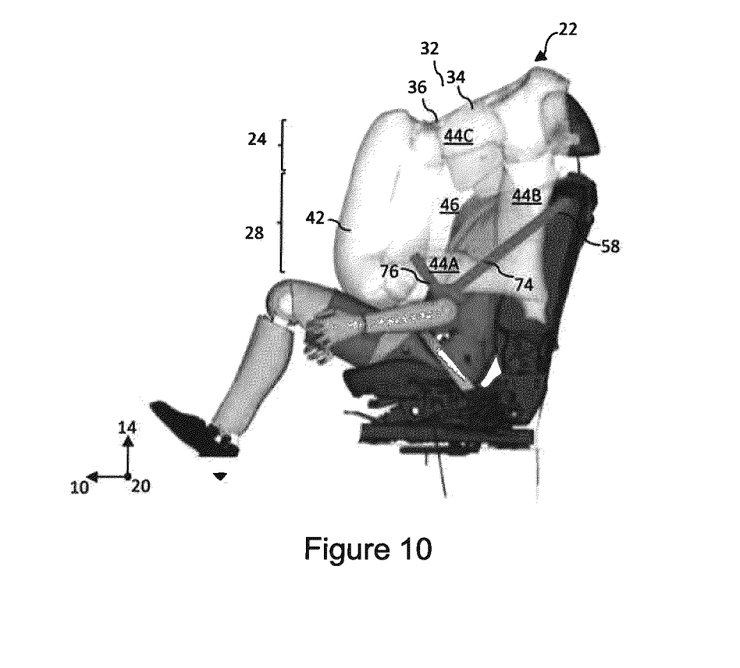
FIGS. 10-12 are respective side, front and top views of the vehicle seat and airbag system of FIGS. 7-9, wherein the airbag is arranged in an inflated configuration.
Figure 11:
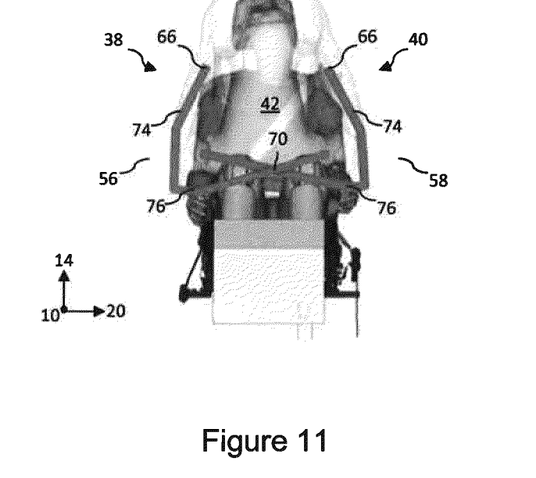
Figure 12:
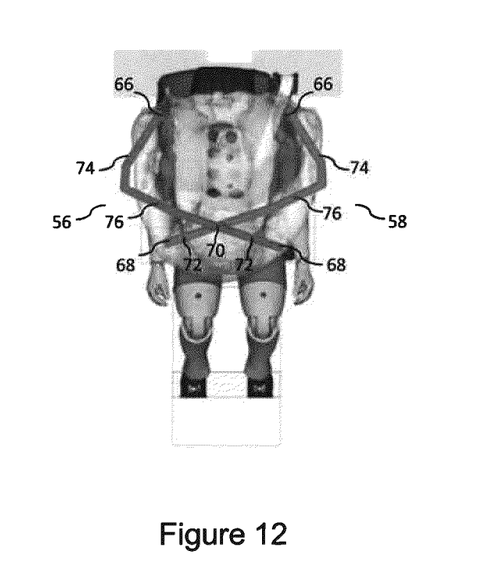

A first portion 74 of the tethers 56, 58 extends from the first end 66 around an exterior of the sides 38, 40 of the airbag 22. In particular, it extends over the exterior surface of inflatable bag portions 44A, 44B, to a lower edge of the portion 44A, where it transitions at a sliding interface (as will be discussed) to a second portion 76. The second portion 76 of the tethers 56, 58 extends from the first portion 74, around an interior surface of the bag portion 44A, and along the interior surface of the front 42 of the airbag 22 with the second end 68 connected to the bag portions 44A, 44B, of the opposed side.

In the illustrated embodiment, the tethers 56, 58 transition from the exterior surface to the interior surface of the airbag by extending around the portion 44A of the airbag. In variant embodiments, which are not illustrated, the transition is through an aperture, which can be implemented as an eyelet.

In embodiments, the transition of the tethers 56, 58 from the exterior surface to the interior surface (i.e. from the first portion 74 to the second portion 76) is a sliding interface adapted to enable sliding of the tethers as the airbag transitions from the deflated to the inflated configuring. In particular, a length of the portion 76 is greater in the inflated configuration than in the deflated configuration, such that as the airbag 22 expands, the tethers 56, 58 slide though/over the sliding interface.

In the inflated configuration, the first tether 56 and second tether 58 also overlap at the interface 70, which is arranged at a midpoint, in the lateral direction, of the front 42 of the airbag 22. The first tether 56 and second tether 58 are not connected at the interface 70. In this way, during inflation, the interface 70 can change position and the tethers can slide over each other rather than pull the airbag down in the height direction 14.

In variant embodiments, which are not illustrated, the tethers are connected at the interface to control the position of the airbag in the height direction during inflation.

The ends 68 of the tethers 56, 58 are connected to the airbag 22. The connection can be a sewn connection, rivet, or other suitable implementation.

With the airbag 22 in the deflated configuration the tethers 56, 58 are arranged in a compressed state, e.g. they are folded and/or rolled, so that they can be conveniently stowed. With the airbag 22 in the in the inflated configuration, the tethers 56, 58 are arranged in an expanded state such that they can accommodate the inflated airbag 22 an occupant 12.

In variant embodiments, which are not illustrated, a single tether may be implemented, which extends between the first and second side at the upper region and around the lower region of the airbag. Alternatively, a single of the first or second tether is implemented.

Embodiment 2

Figure 13:
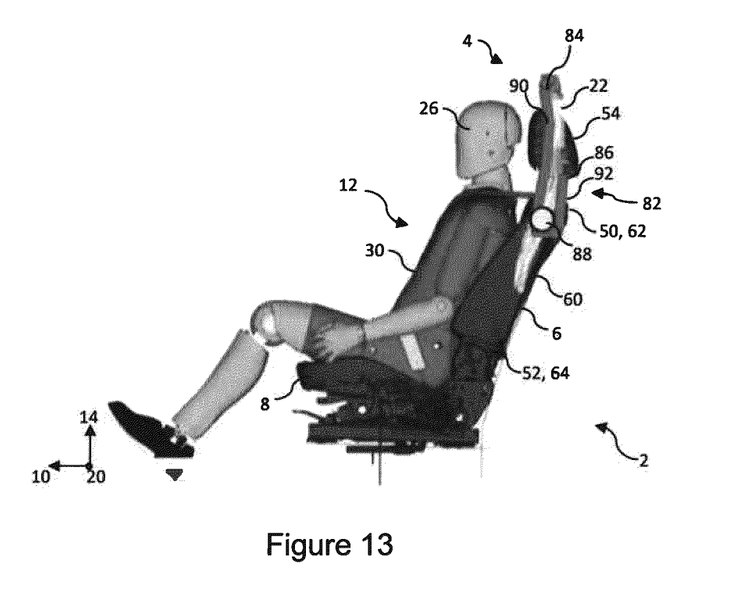
FIGS. 13-15 are respective side, front and top views of a vehicle seat and embodiment airbag system, wherein an airbag of said airbag system is arranged in a deflated configuration.
Figure 14:
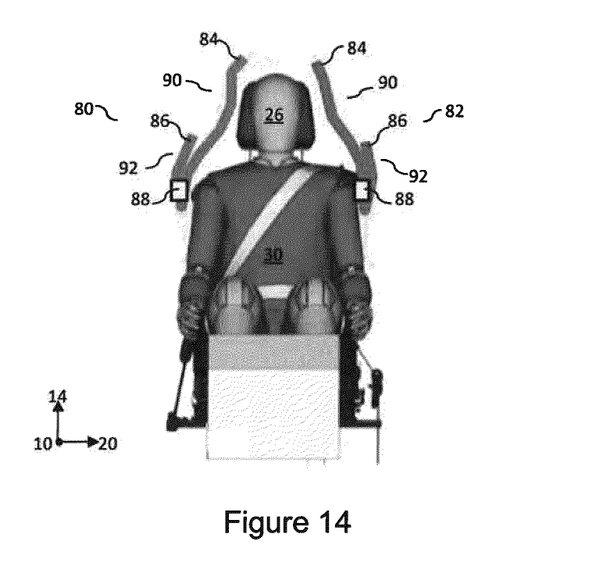
Figure 15:
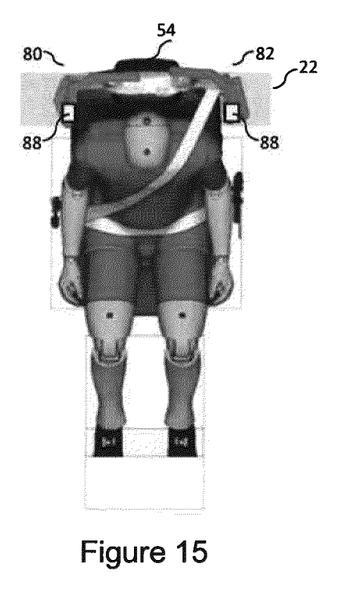

Referring to FIGS. 13-15, in a second embodiment, the airbag system 2 comprises a tether system 48 interconnecting the seat 2 at the second upper region 50 of the backrest 6 and airbag 22 to restrain the lower region 28 of the airbag 22 in the inflated configuration (FIGS. 16-18) in the longitudinal direction 10.

Initially considering the deflated configuration (FIGS. 13-15), the tether system 48 includes a first tether 80 and second tether 82. The first tether 80 and second tether 82 extend from the respective first side 16 and second side 18 of the second upper region 50 of the backrest 6 and around the headrest 54.

In particular, the first tether 80 and second tether 82 can be defined as having a first portion 90 and second portion 92, which transition at a guide 88:

The first portion 90 of the first tether 80 and second tether 82 extends from the guide 88 and around the headrest 54. The first portions 90 of the first tether 80 and second tether 82 do not overlap. A first end 84 of the first portion 90 is arranged on a top of the headrest 54 and away from the mid-section of the headrest 54 in the lateral direction 20.

The second portion 92 of the first tether 80 and second tether 82 extends from the guide 88 to or proximal a lower edge headrest 54. A second end 86 of the second portion 90 is arranged on a lower edge of the headrest 54 and away from the mid-section of the headrest 54 in the lateral direction 20.

The first portions 90 and second portions 92 are connected to the airbag 22 by a connection at their ends 84, 86. The connection can be a sewn connection, rivet, or other suable implementation.

The guide 88 is arranged on the upper position 50 of the backrest 6 to slideably engage the first tether 80 and second tether 82 at a position between the first end 84 and second end 86. Each guide 88 extends outwardly from the first side 16 or second side 18 of the backrest 6. The guide 88 typically comprise a retaining system (not shown) to retain the tether in slideable engagement, and may be implemented as a flanged periphery or other device.

In the deflated configuration, first portion 90 of the first tether 80 and second tether 82 are connected to the portion of the airbag 22 that, in the inflated position, forms the lower region 28. In the deflated configuration, second portion 92 of the first tether 80 and second tether 82 are connected to the portion of the airbag 22 that, in the inflated position, forms the upper region 24.

Moreover, in the deflated configuration, the first portion 90 is arranged in front, in the longitudinal direction 10, of the second portion 92. Accordingly, when transitioning to the inflated configuration, an angle between the first portion 90 and second portion 92 at the guide 88 can increase without collision/overlap of said portions.

Now considering the inflated configuration (FIGS. 16-18), the tethers 80, 82 interconnect directly the second upper position 50 of the seat and the lower region 28 of the airbag 22.

Figure 16:
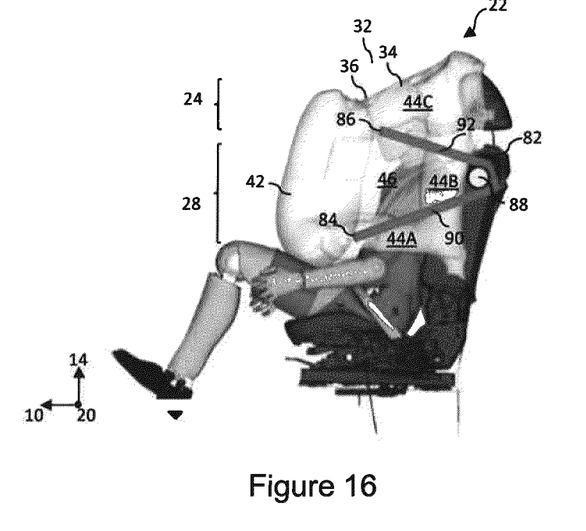
FIGS. 16-18 are respective side, front and top views of the vehicle seat and airbag system of FIGS. 13-15, wherein the airbag is arranged in an inflated configuration.
Figure 17:
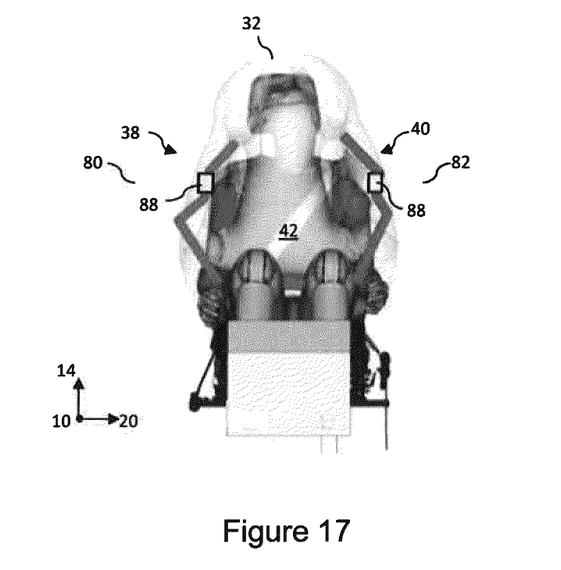
Figure 18:
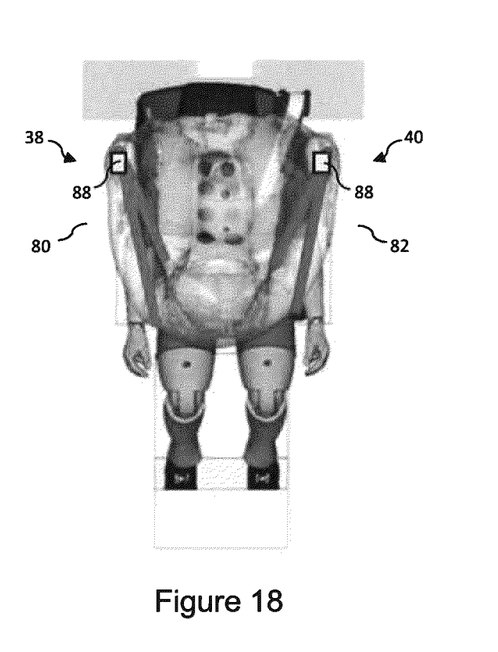

In particular, the first portion 90 of the first tether 80 and second tether 82 extends from the guide 88 and over the exterior surface of inflatable bag portions 44A, 44B, to a lower edge of the portion 44A.

In particular, the second portion 92 of the first tether 80 and second tether 82 extends from the guide 88 and over the exterior surface of inflatable bag portions 44C, 44B, to a lower edge of the portion 44C.

It will be understood that since the guide 88 implements a slideable connection to the first tether 80 and second tether 82, a tensile force in the first portion 90 and second portion 92 is equalised such that the same force is restrained by the tether system 48 at the upper region 24 and lower region 28 of the airbag 22.

It can be seen that in the inflated configuration (FIGS. 16-18), the first portion 90 is greater in length than the second portion 92. During inflation the first tether 80 and second tether 82 slide along the guide to increase the length of the second portion 92.

In the deflated configuration the first portion 90 may have a lesser length than the second portion 92.

With the airbag 22 in the deflated configuration the tethers 80, 82 are arranged in a compressed state, e.g. they are folded and/or rolled, so that they can be conveniently stowed. With the airbag 22 in the in the inflated configuration, the tethers 80, 82 are arranged in an expanded state such that they can accommodate the inflated airbag 22 an occupant 12.

In variant embodiments, which are not illustrated: a single of the first or second tether is implemented; the second portion of a tether is not connected to the airbag, e.g. it is connected to the seat.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example (s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

2 Vehicle seat
6 Backrest
16 First side
18 Second side
50 Second upper position
62 Top
52 First lower position
64 Base
8 Squab
54 Headrest
4 Airbag system
22 Airbag
24 Upper region
32 Top
34 First portion
36 Second portion
28 Lower region
42 Front
38 First side, 40 Second side
44 Inflatable portion
44A-B Inflatable bag portions
46 Non-inflatable portion
60 Ends
48 Tether system Embodiment 1

56 First tether, 58 Second tether
66 First end
68 Second end
70 Overlap
72 Extension portions
74 First portion
76 Second portion Embodiment 2

80 First tether, 82 Second tether
90 First portion
84 First end
92 Second portion
86 Second end
88 Guide
12 Occupant
26 Head
30 Mid-section 10 Longitudinal direction
14 Height direction
20 Lateral direction

The invention claimed is:

1. A vehicle seat and an airbag system,
the seat comprising a backrest and a squab, which extends from the backrest in a longitudinal direction, the backrest extending in height from the squab at a first lower portion to a second upper portion of the seat, the upper portion of the seat configured to be arranged proximal shoulders of an occupant in a seated position,
the airbag system comprising an airbag to receive inflating gas from an inflator to inflate the airbag from a deflated configuration to an inflated configuration, in which the airbag includes an upper region configured to extend over a head of the occupant in said seated position and a lower region configured to extend over a mid-section of the occupant in said seated position,
wherein the airbag system comprises a tether system interconnecting the seat at the second upper portion of the seat and the airbag to restrain the lower region of the airbag in the inflated configuration in the longitudinal direction, the tether system comprising:
a first tether configured to extend, with the airbag in the inflated configuration, in the longitudinal and lateral directions and around the mid-section of the occupant, from the first side of the backrest; and
a second tether configured to extend, with the airbag in the inflated configuration, in the longitudinal and lateral directions and around the mid-section of the occupant from the second side of the backrest, wherein the first and second tether overlap each other between the first and second side.

2. The vehicle seat and the airbag system of claim 1, wherein, with the airbag in the deflated configuration, at least part of the tether system is carried by a headrest of the seat.

3. The vehicle seat and the airbag system of claim 2, wherein the tether system extends from the backrest and around the headrest.

4. The vehicle seat and the airbag system of claim 1, wherein the first and second tether extend beyond said overlap.

5. The vehicle seat and the airbag system of claim 1, wherein a first portion of the first tether extends from the first side of the backrest along an exterior of the airbag and around or through the exterior of a side portion the airbag, and a second portion of the first tether extends from the first portion along an interior of the airbag between a front portion of the airbag and an occupant in the seated position.

6. The vehicle seat and the airbag system of claim 1, wherein a guide is arranged to slideably engage a tether of the tether system, the guide extending from a side of the backrest.

7. The vehicle seat and the airbag system of claim 6, wherein the tether is connected at a first end and a second end to the airbag, the guide arranged between the first end and the second end of the tether.

8. The vehicle seat and the airbag system of claim 7, wherein, with the airbag in the inflated configuration, the first end of the tether is connected to the lower region of the airbag and the second end of the tether is connected to an upper region of the airbag.

9. The vehicle seat and the airbag system of claim 8, wherein a side of the airbag includes peripheral inflatable bag portions and a non-inflatable portion, and the first end is connected to an inflatable bag portion at a bottom of the side and the second end is connected to an inflatable bag portion at a top of the side.

10. The vehicle seat and the airbag system of claim 7, wherein an angle between the first and second end at the guide is greater in the inflated configuration than in the deflated configuration.

11. The vehicle seat and the airbag system of claim 7, wherein, with the airbag in the inflated configuration, the first end is arranged in front, in the longitudinal direction, of the second end.

12. The vehicle seat and the airbag system of claim 6, wherein the tether system extends around an exterior of the airbag in the inflated configuration.

13. The vehicle seat and the airbag system of claim 12, wherein the tether system does not extend around interior and/or a front portion of the airbag.

14. A method of deploying an airbag to protect an occupant of a vehicle seat, the method comprising:
inflating an airbag with an inflator, wherein the airbag includes an upper region configured to extend over a head of the occupant and a lower region configured to extend over a mid-section of the occupant;
controlling a position of the inflated airbag with a tether that extends from an upper region of the seat to the lower region of the airbag, wherein the tether is connected at a first end and a second end to the airbag, and wherein a middle portion of the tether slideably engages a guide extending from a side of the upper region of the seat.

15. A system comprising:
a seat comprising a backrest and a squab extending from the backrest in a longitudinal direction, the backrest extending in height from the squab at a first lower portion to a second upper portion of the seat, the upper portion of the seat configured to be arranged proximal shoulders of an occupant in a seated position; and
an airbag system comprising an airbag to receive inflating gas from an inflator to inflate the airbag from a deflated configuration to an inflated configuration, in which the airbag includes an upper region configured to extend over a head of the occupant in said seated position and a lower region configured to extend over a mid-section of the occupant in said seated position, wherein the airbag system comprises a tether system interconnecting the seat at the second upper portion of the seat and the airbag to restrain the lower region of the airbag in the inflated configuration in the longitudinal direction, wherein a guide is arranged to slideably engage a tether of the tether system, the guide extending from a side of the backrest, and wherein the tether is connected at a first end and a second end to the airbag, the guide arranged between the first end and the second end of the tether.

16. The system of claim 15, wherein, with the airbag in the inflated configuration,
the tether system includes a first tether extending in the longitudinal and lateral directions and around the mid-section of the occupant, from the first side of the backrest,
and the tether system includes a second tether extending in the longitudinal and lateral directions and around the mid-section of the occupant from the second side of the backrest, wherein the first and second tether overlap each other between the first and second side.

17. The system of claim 15, wherein, with the airbag in the inflated configuration, a first end of the tether is connected to the lower region of the airbag and a second end of the tether is connected to an upper region of the airbag.

18. The system of claim 17, wherein a side of the airbag includes peripheral inflatable bag portions and a non-inflatable portion, and the first end is connected to an inflatable bag portion at a bottom of the side and the second end is connected to an inflatable bag portion at a top of the side.

19. The system of claim 15, wherein an angle between the first and second end at the guide is greater in the inflated configuration than in the deflated configuration.

20. The system of claim 15, wherein, with the airbag in the inflated configuration, the first end is arranged in front, in the longitudinal direction, of the second end.

* * * * *